July 1, 1969 W. M. POSINGIES 3,452,767
CONTROL APPARATUS
Filed May 18, 1964

INVENTOR.
WALTER M. POSINGIES
BY Charles J. Ungemach
ATTORNEY

United States Patent Office 3,452,767
Patented July 1, 1969

3,452,767
CONTROL APPARATUS
Walter M. Posingies, Minneapolis, Minn., assignor to Honeywell Inc., Minneapolis, Minn., a corporation of Delaware
Filed May 18, 1964, Ser. No. 367,939
Int. Cl. F15c 1/08, 1/12, 1/14
U.S. Cl. 137—81.5    6 Claims This invention pertains to proportional pure fluid amplifiers, and more particulraly to thermodynamically controlled pure fluid amplifiers. A pure fluid amplifier is defined as a fluid amplifier wherein there are absolutely no moving parts other than the working media (fluid). Fluid amplifier will be defined for purposes of this specification to include the following: (1) pure fluid proportional amplifiers, (2) pure fluid vortex amplifiers, and (3) pure fluid vortex valves. These fluid amplifiers provide an output signal in one or more outlet passages which is indicative of the control signal.

The applicant's unique thermodynamic pure fluid amplifier has special application as an interface between fluid and electrical components. The applicant's invention will be explained with reference to such an application, but it is not limited to such an application. The recent development of pure fluid technology has created many applications wherein pure fluid components (no moving parts) are desired to be combined with conventional electronic components. This requires an electrical to fluid interface, that is, a device which will convert electrical signals into fluid signals. Various approaches have been attempted, however they all violate the no moving part philosophy of pure fluid systems.

The applicant has solved this problem, by providing a thermodynamic fluid amplifier which provides an electrical to fluid interface with no moving parts. Structurally the applicant's thermodynamic fluid amplifier comprises, a proportional amplifier, a vortex amplifier, or a vortex valve which is modified by providing means within the control passages operable to provide a substantially constant mass flow therethrough. Thermodynamic means are positioned intermediate the means and the interaction chamber to the amplifier and function to add heat to the fluid therebetween so as to increase the temperature of the fluid. Increasing the temperature of the fluid in the control passage increases the momentum of the fluid and operates as a fluid signal. This increase in momentum in the fluid in the control passage results in an output signal indicative of the amount of heat added to the fluid in the proportional amplifier, vortex amplifier, or vortex valve. The heat added to the fluid can be applied in various ways, for example electrical resistors, spark plugs, fluid heat exchanges or open flames and the like.

The applicant's invention will become apparent from a study of the accompanying specification and claims in conjunction with the drawings in which:

Figure 1:
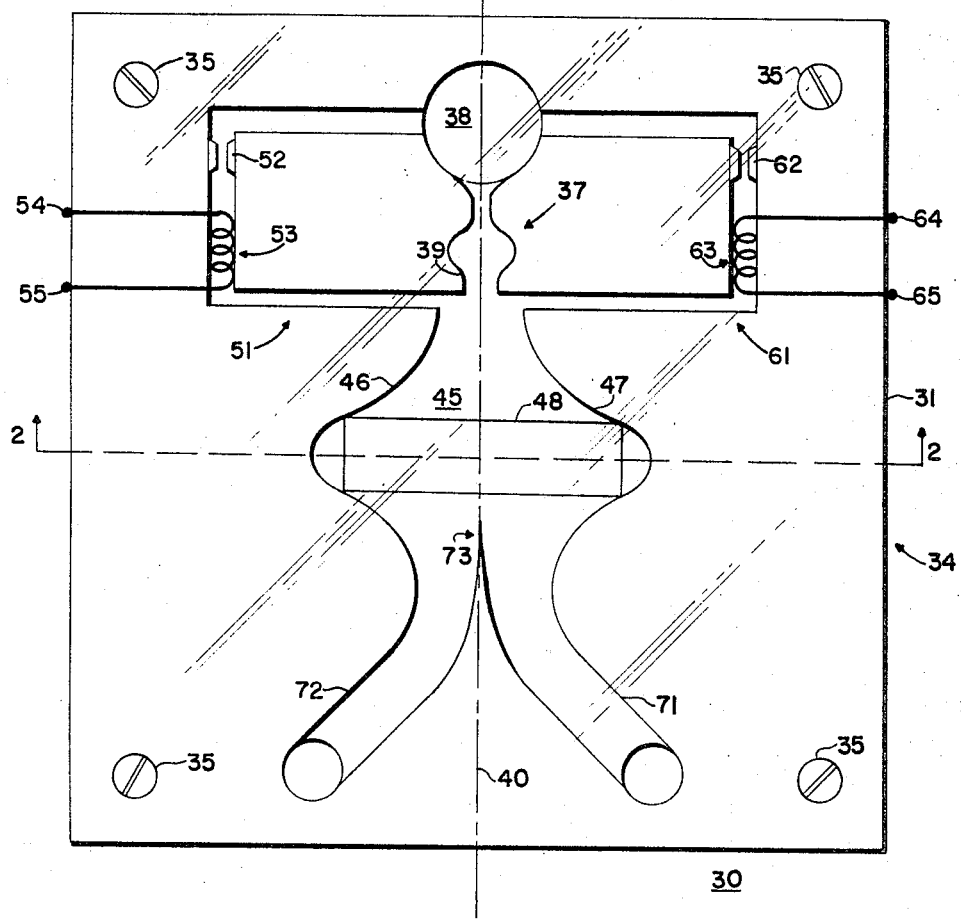
FIGURE 1 is a plan view of one embodiment of the applicant's unique thermodynamic pure fluid amplifier.
Figure 2:
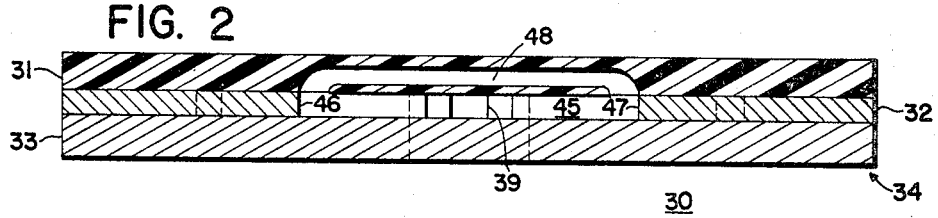
FIGURE 2 is a cross section view taken along line 2—2 of FIGURE 1.

Referring now to FIGURES 1 and 2, one embodiment of the applicant's invention, that is, a themodynamic proportional amplifier is illustrated. Reference numeral 30 generally depicts a thermodynamic proportional pure fluid amplifier. A transparent, rectangular shaped cover plate is identified by reference numeral 31. Cover plate 31 need not be fabricated from a transparent material, other types of material may be utilized. A body element 32 is provided having the reqisite fluid passages therein. A rectangular shaped bottom element 33 is positioned on the opposite side of body element 32 from cover element 31. Cover element 31, body element 32 and bottom element 33 cooperate to form a housing means 34. Cover 31, body element 32, and bottom element 33 are held together by means of a plurality of screws 35. The applicant does not desire to be limited to this particular fabrication technique, other techniques are obvious to those skilled in the art.

A fluid supply passage 37 is provided in housing means 34. Fluid supply passage 37 comprises a fluid conduit 38 and a supply nozzle 39. The longitudinal axis of supply passage 37 defines an axis 40. Supply passage 37 is adapted to be connected to a substantially constant pressure fluid source (not shown). Fluid flowing through supply passage 37 is directed substantially along axis 40.

An interaction chamber 45 is provided within housing means 34 and is symmetrical with respect to axis 40. The walls defining interaction chamber 45 are identified by reference numerals 46 and 47. A cross-over passage 48 is provided within cover element 31 so as to provide a low impedance path across chamber 45 (see FIGURE 2). Fluid flow through supply passage 37 is directed into interaction chamber 45 substantially along axis 40.

Two control passages 51 and 61 are provided within housing 34. Control passage 51 is connected at one end to conduit 38 of supply passage 37. The other end of control passage 51 is in communication with interaction chamber 45. A sonic restrictor 52 is positioned within control passage 51. A thermodynamic means 53 is positioned within control passage 51 intermediate restrictor 52 and interaction chamber 45. In the particular embodiment illustrated in FIGURE 1, thermodynamic means 53 is in the form of an electrical resistor. Thermodyamic means 53 is connected to a source of electrical energy (not shown) through terminals 54 and 55. Control passage 61 is similar to control passage 51 and connects at one end to conduit 38 a supply passage 37 and at the other end to interaction chamber 45. A sonic restrictor 62 is provided within control passage 61. A thermodynamic means 63 is positioned within control passage 61 intermediate restrictor 62 and interaction chamber 45. Thermodynamic means 63 is in the form of an electrical resistance in FIGURE 1 and is connected to an electrical power source (not shown) by means of terminals 64 and 65.

In one successful embodiment, thermodynamic means 53 and 63 were 10 ohm resistors, and were connected to a 3 volt source of electrical energy. Utilizing air as the fluid with a supply stream pressure of 8 inches of Hg, an output signal of plus or minus 2 inches of water was obtained. Thus a large magnitude signal is obtained with a minimum of power demand (.9 watt).

Two outlet passages 71 and 72 are provided within housing means 34. Outlet passages 71 and 72 are separated by means of a divider element 73 and are in communication with interaction chamber 45. Amplifier 30 may utilize only a single outlet passage or a plurality. The applicant does not wish to be limited to two outlet passages.

In operation, fluid conduit 38 is connected to a constant pressure fluid source (not shown) such as air. A portion of the fluid within conduit 38 exhausts through supply nozzle 39 thereby providing a stream of fluid which flows substantially along axis 40. Nozzle 39, as illustrated, is a subsonic nozzle, however it may be operated as a supersonic nozzle. The remainder of the fluid flowing through conduit 38 flows into control passages 51 and 61 at equal flow rates. Sonic restrictors 52 and 62 function to maintain a constant mass flow through the control passages. When sonic restrictors 52 and 62 are identical in size, equal mass flow is obtained in each control passage. Thus the momentum of the fluid flow within control passage 51 is equal to the momentum of the fluid flow through control passage 61. Thus, in the absence of any control signals, the fluid flowing through control passages 51 and 61 exerts equal and opposite forces upon the stream of fluid issuing from supply nozzle 39. The stream of fluid flows substantially along axis 40 and flows into interaction chamber 45 and exhausts through outlet passages 71 and 72 at substantially equal flow and at substantially equal pressure levels. Thus there is no differential output signal (fluid flow or pressure) generated by fluid amplifier means 30 in the absence of any control signals.

When a control signal is received in one of the control passages an output signal is obtained in the outlet passages indicative thereof. More specifically, if thermodynamic means 53 is energized by applying a potential across terminals 54 and 55, the temperature of thermodynamic means 53 is raised. Consequently, the temperature of the fluid between sonic restrictor 52 and interaction chamber 45 is also increased. Since a constant mass flow is maintained within control passage 51 by sonic restrictor 52, an increase in temperature in the fluid results in an increase in the momentum of the fluid. The increase in momentum is proportional to the control signal received at terminals 54 and 55. If thermodynamic means 63 is not energized or is energized a lesser amount, the momentum of the fluid flowing through control passage 51 exceeds the momentum of the fluid flowing through control passage 61. Consequently, the stream of fluid flowing from supply nozzle 39 is deflected away from axis 40 and towards outlet passage 71. The flow differential between outlet passages 71 and 72 is indicative of the magnitude of the applied control signal. Thus amplifier 30 provides a fluid output signal (fluid flow or pressure level) which is indicative of an electrical input signal. This is obtained without any moving parts in amplifier 30 thus preserving the pure fluid concept.

Figure 3:
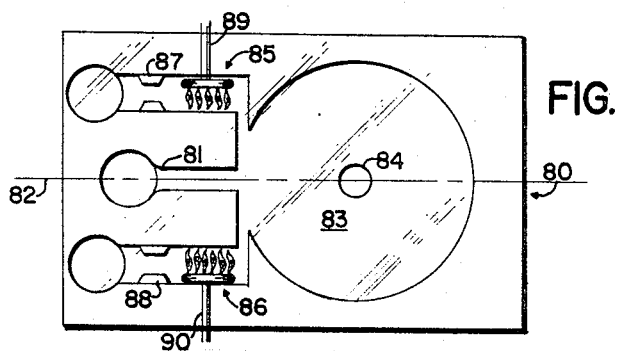
FIGURE 3 is a plan view of an alternate embodiment of the applicant's invention.

Of course, various other types of thermodynamic means may be utilized to increase the temperature of the fluid in the control passages. The applicant does not wish to be limited to an electrical input signal. For example, in addition to electrical resistors, fluid heat exchangers, or open flames and the like may be utilized. FIGURE 3 illustrates an alternate embodiment of the applicant's thermodynamic fluid amplifier. Reference numeral 80 generally depicts a vortex valve. Vortex valve 80 includes a supply passage 81 adapted to provide a stream of fluid which flows substantially along an axis 82. A generally cylindrical vortex chamber 83 is provided which is symmetrical with respect to axis 82. Supply passage 81 is in communication with chamber 83. An outlet passage 84 is in communication with the center of chamber 83. Vortex valve 80 also includes a pair of control passages 85 and 86. It will be noted that control passages 85 and 86 are connected to a different fluid source than supply passage 81. Control passages 85 and 86 each have a sonic restrictor therein identified by reference numeral 87 and 88 respectively. The thermodynamic element in control passages 85 and 86 is a burner element schematically represented in FIGURE 3 by reference numerals 89 and 90. Burners 89 and 90 directly heat the fluid containing passages 85 and 86 in response to a suitable control signal. Of course various other thermodynamic elements may be utilized and are obvious to those skilled in the art. The choice of the particular thermodynamic element to be utilized depends upon the time constant required for the amplifier.

In operation, supply passage 81 is connected to a fluid source and provides a stream of fluid flowing substantially along axis 82. In the absence of any control signal, the stream of fluid flows into vortex chamber 83 along axis 82 and exhausts therefrom through outlet passage 84. A constant flow rate exhausts through outlet passage 84 which provides a null signal with no control signal output. When a control signal is received in one of the control passages, an output flow rate is obtained in outlet passage 84 which is a function thereof. More specifically, if thermodynamic means 89 adds heat to the fluid in control passage 85, the momentum of the fluid therein is increased. The fluid flowing from control passage 85 impinges upon and deflects the stream of fluid away from axis 82 and causes it to flow in a vortical pattern. The vortical pattern of fluid flow through chamber 83 varies the fluid flow rate exhausting from outlet passage 84. The variation in flow rate in outlet passage 84 is a function of the control signal.

Vortex valve 80 may be provided with a pickoff means to sense an output signal other than flow rate. For example, a pickoff means may be utilized which provides a pressure differential pickoff. When vortex valve 80 is supplied with such a pickoff, it is generally referred to as a vortex amplifier. Thus it is clear that the applicant's invention is applicable with a vortex amplifier.

The output signal obtained from the thermodynamic fluid amplifier is a function of the heat added to the fluid, that is, the temperature rise of the fluid. Consequently, the applicant's thermodynamic fluid amplifier can be utilized as a temperature sensor to determine the temperature or temperature change of the fluid in the control passage.

Thus the applicant has provided a unique thermodynamic pure fluid amplifier utilizing means for providing a constant mass flow through the control passages and thermodynamic means to add heat to the fluid flowing therein. An output signal is obtained which is indicative of the amount of heat added to the fluid.

I claim as my invention:

1. A proportional thermodynamic fluid amplifier comprising:

housing means;

a supply nozzle within said housing means adapted to provide a high momentum stream of fluid flowing substantially along an axis;

an interaction chamber within said housing means, said supply nozzle being in communication with said chamber;

a first control passage within said housing means inclined with respect to said axis, one end of said first control passage being in communication with said chamber, the other end of said first control passage being adapted to be connected to a low momentum fluid source;

a first sonic restrictor positioned within said first control passage, said sonic restrictor being operable to maintain a substantially constant mass flow through said first control passage;

a first electrical resistor positioned within said first control passage intermediate said sonic restrictor and said one end of said first control passage;

means for energizing said first resistor so as to add heat to the fluid adjacent thereto and increase the momentum of the fluid;

a second control passage within said housing means inclined with respect to said one end of said first control passage being in communication with said chamber, the other end of said first control passage being adapted to be connected to a low momentum fluid source;

a sonic restrictor positioned within said second control passage, said sonic restrictor being operable to maintain a substantially constant mass flow through said second control passage;

a second electrical resistor positioned within said second control passage intermediate said sonic restrictor and said one end of said second control passage;

means for energizing said second resistor so as to add heat to the fluid adjacent thereto and increase the momentum of the fluid;

a first outlet passage adapted to receive the stream of fluid; and a second outlet passage adapted to receive the stream of fluid, whereby the stream of fluid is deflected from said axis an amount indicative of the difference between the amount of heat added to the fluid by said first resistor and the amount of heat added to the fluid by said second resistor.

2. A proportional thermodynamic fluid amplifer comprising:

housing means;

a supply nozzle within said housing means adapted to provide a high momentum stream of fluid flowing substantially along an axis;

an interaction chamber within said housing means, said supply nozzle being in communication with said chamber;

a first control passage within said housing means inclined with respect to said axis, one end of said first control passage being in communication with said chamber, the other end of said first control passage being adapted to be connected to a low momentum fluid source;

a first sonic restrictor positioned within said first control passage, said sonic restrictor being operable to maintain a substantially constant mass flow through said first control passage;

a first heat exchanger positioned within said first control passage intermediate said sonic restrictor and said one end of said first control passage, said first heat exchanger being operable to add heat to the fluid adjacent thereto and increase the momemtum of the fluid;

a second control passage within said housing means inclined with respect to said axis one end of said first control passage being in communication with said chamber, the other end of said first control passage being adapted to be connected to a low momentum fluid source;

a sonic restrictor positioned within said second control passage, said sonic restrictor being operable to maintain a substantially constant mass flow through said second control passage;

a second fluid heat exchanger positioned within said second control passage intermediate said sonic restrictor and said one end of said second control passage, said second heat exchanger being operable to add heat to the fluid adjacent thereto and increase the momentum of the fluid;

a first outlet passage adapted to receive the stream of fluid; and a second outlet passage adapted to receive the stream of fluid, where the stream of fluid is deflected from said axis an amount indicative of the difference between the amount of heat added to the fluid by said first heat exchanger an the amount of heat added to the fluid by said second heat exchanger.

3. A proportional thermodynamic fluid amplifier comprising:

housing means;

a supply nozzle within said housing means adapted to provide a high momentum stream of fluid flowing substantially along an axis;

an interaction chamber within said housing means, said supply nozzle being in communication with said chamber;

a first control passage within said housing means, one end of said first control passage being in communication with said chamber, the other end of said first control passage being adapted to be connected to a low momentum fluid source;

a first sonic restrictor positioned within said first control passage, said sonic restrictor being operable to maintain a substantially constant mass flow through said first control passage;

a first burner element positioned within said first control passage intermediate said sonic restrictor and said one end of said first control passage, said first burner element being operable to add heat to the fluid adjacent thereto and increase the momentum of the fluid;

a second control passage within said housing means, one end of said first control passage being in communication with said chamber, the other end of said first control passage being adapted to be connected to a low momentum fluid source;

a sonic restrictor being operable to maintain a substantially constant mass flow through said second control passage;

a second burner element positioned within said second control passage intermediate said sonic restrictor and said one end of said second control passage, said second burner element being operable to add heat to the fluid adjacent thereto and increase the momentum of the fluid;

a first outlet passage adapted to receive the stream of fluid; and a second outlet passage adapted to receive the stream of fluid, whereby the stream of fluid is deflected from said axis an amount indicative of the difference between the amount of heat added to the fluid by said first burner element and the amount of heat added to the fluid by said second burner element.

4. A proportional thermodynamic fluid amplifier comprising:

a supply nozzle adapted to be connected to a fluid source, said supply nozzle operable to provide a stream of fluid substantially along an axis;

an interaction chamber, said nozzle being in communication with said chamber;

a control passage adapted to be connected to said fluid source, said control passage being in communication with said chamber;

a restrictor positioned within said control passage, said restrictor being operable to maintain a substantially constant fluid mass flow therethrough;

thermodynamic means positioned within said passage intermediate said restrictor and said chamber, said thermodynamic means being operable to increase the temperature of the fluid within said control passage between said chamber and said restrictor so as to increase the momentum of the fluid in said control passage, the increase in momentum of the fluid being effective to deflect the stream of fluid from said axis;

a first outlet passage; and a second outlet passage, said first and said second outlet passages being in communication with said chamber so as to receive the stream of fluid, the difference in flow between said first outlet pasasge and said second outlet passage being indicative of the increase in temperature of the fluid in said control passage by thermodynamic means.

5. A proportional thermodynamic fluid amplifier comprising:
- a supply nozzle adapted to be connected to a fluid source, said supply nozzle operable to provide a stream of fluid substantially along an axis;
- an interaction chamber, said nozzle being in communication with said chamber;
- a control passage adapted to be connected to a fluid source, said control passage being in communication with said chamber;
- first means positioned within said control passage for maintaining a substantially constant fluid mass flow therethrough;
- thermodynamic means positioned within said passage intermediate said first means and said chamber, said thermodynamic means being operable to add heat to the fluid within said control passage between said chamber and said first means so as to increase the momentum of the fluid, the increase in momentum being effective to deflect the stream of fluid from said axis;
- a first outlet passage; and
- a second outlet passage, said first and said second outlet passages being positioned to receive the stream of fluid, the difference in flow between said first outlet passage and said second outlet passage being indicative of the amount of heat added to the fluid in said control passage by said thermodynamic means.

6. A proportional thermodynamic fluid amplifier comprising:
- a supply nozzle adapted to be connected to a fluid source, said supply nozzle operable to provide a stream of fluid substantially along an axis;
- a chamber, said nozzle being in communication with said chamber;
- a control passage adapted to be connected to a fluid source, said control passage being in communication with said chamber;
- first means positioned within said passage for maintaining a substantially constant fluid mass flow therethrough;
- thermodynamic means positioned within said passage intermediate said first means and said chamber, said thermodynamic means being operable to add heat to the fluid within said control passage between said chamber and said first means so as to increase the momentum of the fluid, the increase in momentum being effective to deflect the stream of fluid from said axis; and
- an outlet passage, said outlet passage being positioned to receive the stream of fluid, the flow rate within said outlet passage being indicative of the amount of heat added to the fluid in said control passage by said thermodynamic means.

References Cited
UNITED STATES PATENTS

| | | | |
|---|---|---|---|
| 3,001,539 | 9/1961 | Hurvitz | 137—81.5 |
| 3,122,062 | 2/1964 | Spivak | 137—81.5 |
| 3,144,208 | 8/1964 | Severson | 137—81.5 |
| 3,168,897 | 2/1965 | Adams | 137—81.5 |

M. CARY NELSON, *Primary Examiner.*

WILLIAM R. CLINE, *Assistant Examiner.*